FIG. I
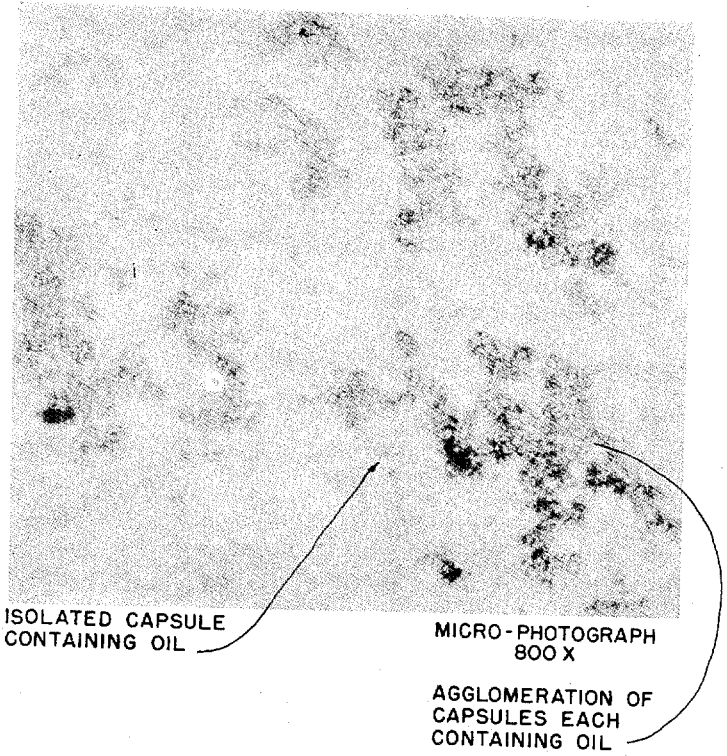

July 23, 1957   B. K. GREEN ET AL   2,800,457
OIL-CONTAINING MICROSCOPIC CAPSULES AND METHOD OF MAKING THEM
Filed June 30, 1953   5 Sheets-Sheet 2
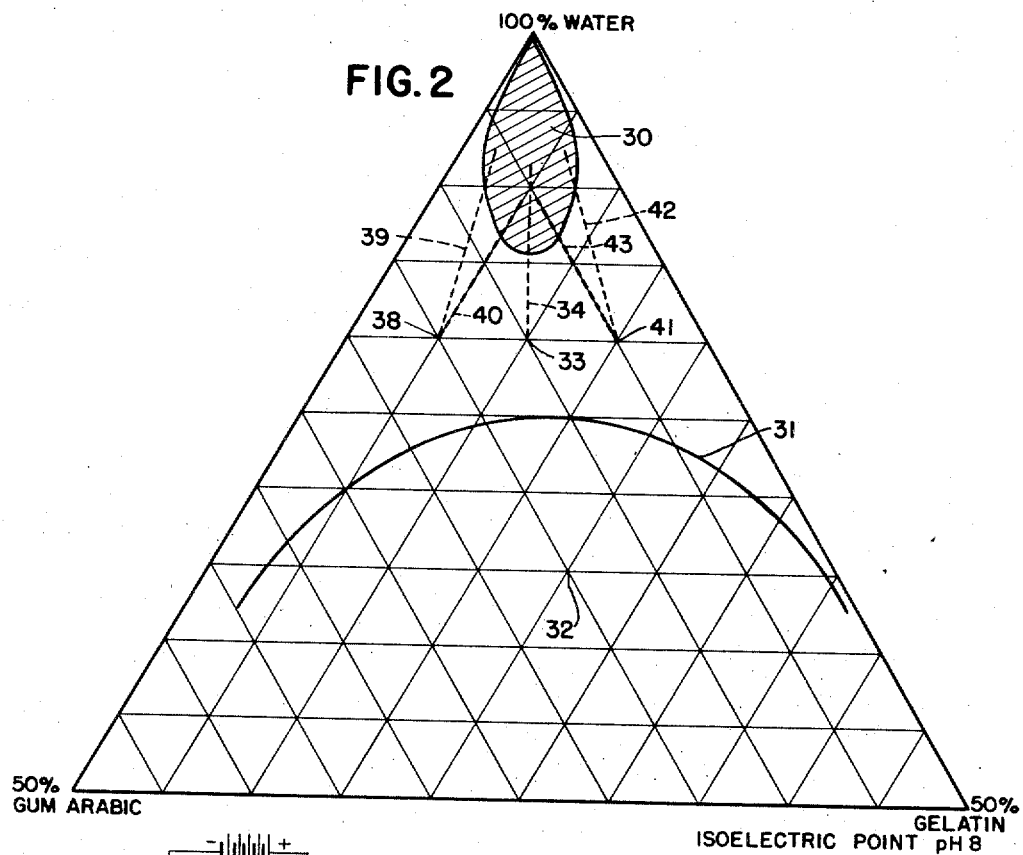
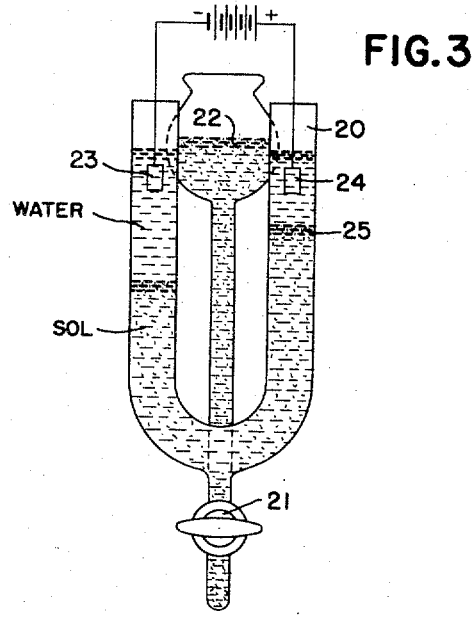
INVENTORS
BARRETT K. GREEN
LOWELL SCHLEICHER
THEIR ATTORNEYS

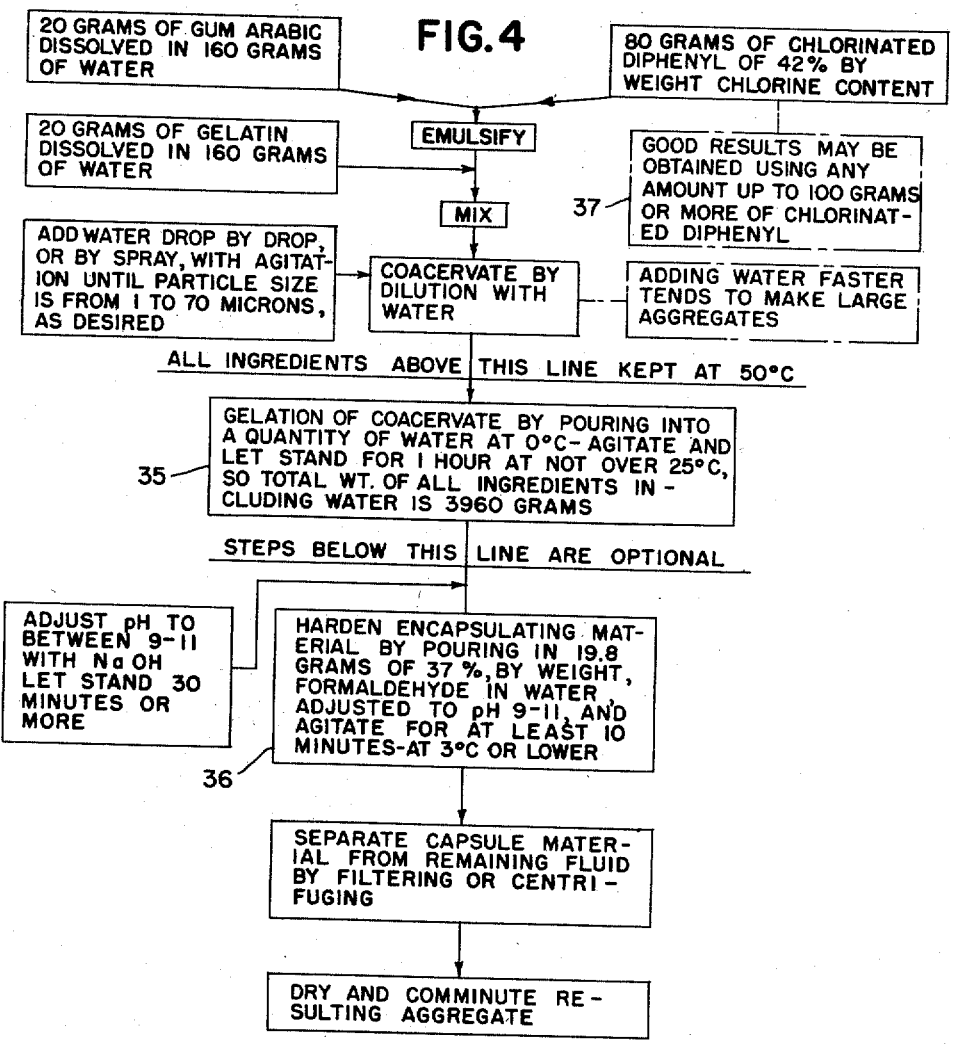

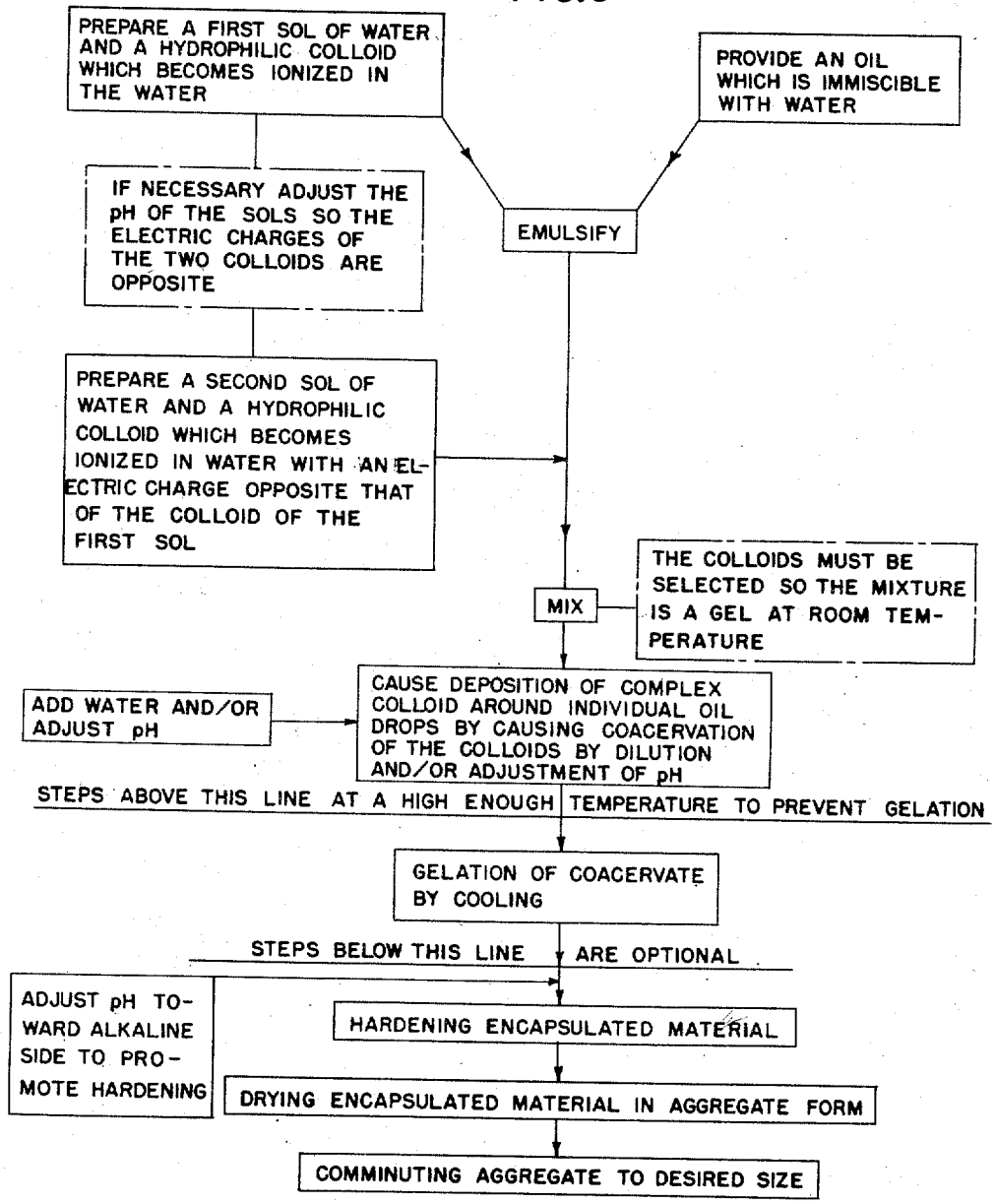

July 23, 1957 B. K. GREEN ET AL 2,800,457
OIL-CONTAINING MICROSCOPIC CAPSULES AND METHOD OF MAKING THEM
Filed June 30, 1953 5 Sheets-Sheet 5

FIG. 6

```
┌─────────────────────────┐                    ┌──────────────────────────┐
│ 20 GRAMS OF GUM ARABIC  │                    │ 80 GRAMS OF CHLORINATED  │
│ DISSOLVED IN 160 GRAMS  │                    │ DIPHENYL OF 42%, BY WEIGHT,│
│ OF WATER                │                    │ CHLORINE CONTENT         │
└─────────────┬───────────┘                    └────────────┬─────────────┘
              └──────────┐  ┌──────────┐  ┌────────────────┘
                         ▼  ▼ EMULSIFY ◄──┐
┌─────────────────────────┐  └──────────┘ │ ┌──────────────────────────┐
│ 20 GRAMS OF PIGSKIN GEL-│        │      │ │ GOOD RESULTS MAY         │
│ ATIN, WITH ITS ISOELECTRIC───────┘      │ │ BE OBTAINED USING        │
│ POINT AT pH 8, DISSOLVED│       ┌───────┴─┐│ ANY AMOUNT UP TO         │
│ IN 160 GRAMS OF WATER   │       │EMULSIFICATION│100 GRAMS OR MORE    │
└─────────────────────────┘       │MAY BE DONE   │OF CHLORINATED         │
                                  │WITH THE GEL- │DIPHENYL              │
                                  │ATIN SOL      │                      │
                                  └──────────────┘
                              ┌───────┐
                              │  MIX  │
                              └───┬───┘
                                  │       ┌──────────────────────────────┐
                                  ├───────│ ADJUST pH TO 5 WITH 20%      │
                                  │       │ SODIUM HYDROXIDE IN WATER    │
                                  ▼       └──────────────────────────────┘
                      ┌──────────────────┐
                      │ MIX WITH ABOUT   │
                      │ 500 TO 550 GRAMS │
                      │ OF WATER         │
                      └────────┬─────────┘
                               │         ┌──────────────────┐
                               ├─────────│ ADJUST pH TO 4.4 │
                               ▼         └──────────────────┘
              ┌──────────┐ ┌──────────────────────┐
              │ AGITATE  │►│ ADD 3.8 GRAMS 37%    │
              └──────────┘ │ FORMALDEHYDE IN      │
                           │ WATER                │
                           └──────────┬───────────┘
```

ALL INGREDIENTS ABOVE THIS LINE KEPT AT 50°C

```
              ┌──────────┐ ┌─────────────────────────────┐
              │ AGITATE  │►│ LOWER TEMPERATURE RAPIDLY   │
              └──────────┘ │ TO 10°C (ABOUT 30 MIN.) TO GEL│
                           └──────────────┬──────────────┘
                                  │       ┌──────────────────────────────┐
                                  │       │ ADJUST pH TO 9 WITH 20%      │
                                  ├───────│ SODIUM HYDROXIDE IN WATER.   │
                                  │       │ (SODIUM CARBONATE MAY BE     │
                                  │       │ SUBSTITUTED FOR THE          │
                                  │       │ SODIUM HYDROXIDE)            │
                                  ▼       └──────────────────────────────┘
                      ┌──────────────────────────┐
                      │ HARDEN, DRY, AND COMMINUTE,│
                      │ IF DESIRED, ACCORDING TO │
                      │ SIMILAR STEPS OF FIG. 4  │
                      └──────────────────────────┘
```

INVENTORS
BARRETT K. GREEN
LOWELL SCHLEICHER

BY *[signatures]*

THEIR ATTORNEYS

United States Patent Office 2,800,457
Patented July 23, 1957

2,800,457

OIL-CONTAINING MICROSCOPIC CAPSULES AND METHOD OF MAKING THEM

Barrett K. Green and Lowell Schleicher, Dayton, Ohio, assignors to The National Cash Register Company, Dayton, Ohio, a corporation of Maryland Application June 30, 1953, Serial No. 365,105

11 Claims. (Cl. 252—316)

This invention relates to oil-containing microscopic capsules of complex hydrophilic colloid material and to a method of making them by coacervation.

In general, the capsules, which are microscopic oil-droplet-containing oil-impermeable cases formed of dense, gelled complex colloid material, are formed by causing deposition of complex colloid material around microscopic oil droplets as nuclei by a process of causing coacervation by dilution or adjustment of the pH to occur in a mixture of two different colloid sols in which the oil droplets are dispersed, and then gelling the complex colloid.

The mixture may be made by forming an aqueous sol of one colloid, emulsifying the selected oil therein, and mixing the emulsion with an aqueous sol of another colloid, or the two sols may be made and mixed and the oil emulsified therein.

The coacervation is caused by dilution and/or by adjusting the pH of the mixture. The gellable colloid materials used in the sols must be ionizable and exist in the mixture with opposite electric charges. This may be brought about by selection of the colloid materials or by adjusting the pH of the sol mixture in which the oil droplets are dispersed in the event one or both of the colloids are amphoteric.

If desired, after the gelation, any of the further steps of hardening the gelled material; separating the hardened gelled material from the remaining liquid; drying it; and comminuting it to the desired particle size, may be used.

Either one or both of the colloid materials should be gellable and used in such concentration that the coacervate complex colloid material is gellable. The process steps, down to the gelation step, are carried out with the ingredients at a temperature above the gel point of the colloid materials used, and gelation is brought about by cooling.

The finished product, before drying, may be used for coatings or films, as the capsules adhere together after drying, or the material may be cast into any wanted form.

If desired, after hardening and drying, the agglomerate mass of capsules may be comminuted to form fine granules of any desired size. The capsules, being so small and tending in the agglomerate form to cleave between the capsules, are not destroyed to any great extent by comminution of the mass.

The droplets of oil in the capsuless of the product are centrally located in the capsule and are protected from contact with the surrounding environment by a thick self-supporting tough shell-like film of the colloid materials. The encapsulating complex colloid material may be hardened and water-insolubilized to a point where the capsules are highly resistant to heat and moisture. The encapsulating film of a capsule may contain one or more droplets of oil, the droplets in the latter case maintaining their identity by persistence of the emulsion interface film.

By "oil" or "oils," as used in this specification, is meant any water-non-miscible fluid suitable for making oil-in-water emulsions. Included among the oils are those that occur naturally, such as olive oil; coconut oil; castor oil; fish oils; animal oils such as sperm oil; essential vegetable oils; mineral oils such as petroleum lubricating oil and kerosene, and xylene; and synthetic oils such as chlorinated diphenyl, methyl salicylate, etc. The oils may contain dissolved or dispersed material such as medicines, adhesives, dyes, and the like. In the case of dispersed material, it should be sufficiently fine to be colloidal in size.

By "ionizable hydrophilic colloid material" are meant substances such as gelatin; albumen; alginates, such as sodium alginate; casein; agar-agar; starch; pectins; carboxy-methylcellulose; Irish moss; and gum arabic.

As has been said, in order that coacervation may occur, the two kinds of colloid ions, as they exist in the mixture before coacervation, must have different electric charges. Some kinds of hydrophilic colloid ions in aqueous sols are negatively charged, regardless of the pH of the sol; some kinds are positively charged, regardless of the pH of the sol; and some are amphoteric, having an iso-electric point above which they are negatively charged and below which they are positively charged. The electric charge characteristics of a hydrophilic colloid under consideration may be determined by electro-phoresis in a manner to be described. In the event that one or both of the colloids used are amphoteric, the pH of the sols may be so adjusted that the colloid ions of the two kinds are of different electric charge. Amphoteric hydrophilic colloids of the same iso-electric point cannot be used.

In the process of coacervation, the complex colloid material deposits around the oil droplets to form the capsules.

One of the main uses for the capsules formed by this process is in the making of transfer films on manifold record material. The oil in the microscopic capsules so used would be of itself or contain a marking material which would be transferred to an underlying sheet by printing or marking pressures that rupture the capsules of the transfer film, to cause marks on said underlying sheet. Transfer films of rupturable type which contain oily droplets of marking fluid are disclosed in United States Patent No. 2,548,366, which issued on the application of Barrett K. Green, one of the applicants of this application, and Robert W. Sandberg, but such disclosed films are not composed of capsules. Transfer films such as those disclosed in the Green and Sandberg patent consist of a continuous film phase of hydrophilic colloid material having fluid droplets of oil dispersed therethrough. The aforesaid film affords some opportunity for escape of the fluid droplets because of the sponge-like texture of the colloid gel. Cracks in the films of the type disclosed in said patent will run right across the voids holding the oil, releasing the oil. Such cracks may be caused by folding the record material or may be caused by unusual environmental conditions.

The product of this invention makes transfer films much superior to those disclosed in the said patent, in that cracks in a film formed of the capsules of this invention do not run across the capsules, but run around them, so that the oil is not released by random cracks produced in the film. Moreover, the pore size of the complex colloid encapsulating film may be reduced during gelation and drying to hold the oil inside, as will be explained.

By the preferred method of manufacture of these capsules, the colloid material deposits around each oil droplet as a nucleus, forming a dense shell-like oil-impervious case with the oil nucleus at the center.

Because all films of gelled hydrophilic colloid material are to a degree molecularly porous because of the nature of gel structures, the capsules will be more or less porous according to the control exercised in forming hem. If the gelation step is performed rapidly, the pore size will be small and the capsules will retain, by sieve action, oils having relatively small molecules. If the gelation step is performed slowly, the pore structure of the encapsulating material will be coarser. The pore size of the capsules may be reduced further by a subsequent step in a high pH environment, as will be described, which makes the capsules harder, more heat resistant, and insoluble in water. If the capsules are used to hold marking fluids, small pores are desired, whereas, if the capsules are to be used for other purposes where slow release of the oil from the capsules is desired, larger pores would be preferred.

Other uses for the capsules involve the protection of oils against the deteriorating influence of the environment, to confine the odors of oils such as perfume oils, and to prevent the reaction of oils with other substances during handling or storage. Further uses of such capsules are to confine medicinal oils to prevent them from being tasted upon being swallowed by a patient, to protect them from the deleterious influence of various environments in which they may be stored, or to protect such from contamination with substances with which they may be mixed.

The capsules may be used in a liquid vehicle or may be dried in an oven and the resulting agglomerate material ground to form apparently dry granules. If desired, the fluid-suspended capsules may be spray-dried, in which event no comminution is necessary. In the dry granular form the capsules containing the fluid oil are handled and stored in the same manner as dry materials are handled and stored.

Therefore, it is an object of this invention to provide oil-containing microscopic capsules, the encapsulating material being a gelled hydrophilic colloid complex that is impervious to the oil and deposited evenly and densely about the oil as a nucleus.

It is another object of the invention to provide such capsules dispersed in a liquid.

It is an alternative object to provide such capsules in apparently dry form.

It is a further object of the invention to provide oil-containing capsules of hydrophilic colloid complex material in which the pore size of the encapsulating material has been controlled by controlling the environmental conditions of its manufacture.

Another further object of the invention is to provide such oil-containing capsules in which the encapsulating material has been hardened.

A still further object of the invention is to provide a process in which complex colloid material is deposited around oil droplets as nuclei, gelled, hardened and dried.

With further objects in view which will become apparent in the specification to follow, the invention includes the use of novel ingredients and processing steps, some of which are optional, described with reference to the drawings which accompany and form a part of this specification.

Of the drawings:

Fig. 1 is a reproduction of a micro-photograph of the capsules dispersed in a fluid, the magnification being about 800 diameters.

Fig. 2 is a ternary diagram showing the complex coacervation region of mixtures of gum arabic and gelatin aqueous sols without any artificial adjustment of the pH value, which is 4.5.

Fig. 3 shows an apparatus by which a colloid material's electric charge and iso-electric point may be determined.

Fig. 4 shows the steps of the process when no pH adjustment is made in the coacervating step.

Fig. 5 is a chart of the steps of the process in generalized form.

Fig. 6 is a chart of the steps of the process when adjustment of the pH is used for causing coacervation.

The process in general, as shown in Fig. 5, includes the steps of forming a first sol by dispersing one of the selected colloid materials in water; introducing the selected oil and forming an oil-in-water emulsion by beating or stirring; forming a second sol, similar to the first in concentration and amount, of the other selected colloid material and water; mixing the emulsion and the second sol; adjusting the pH of the mixture, if necessary, so that the ions of the two colloids have different electric charge; diluting with water, and/or changing the pH of the mixture until the complex coacervation takes place, all of the foregoing steps having been performed at a temperature above the gelation point of the colloids; cooling the resulting complex coacervate material to cause it to gel, as by subjecting it to an environment having a temperature below the gelation point of the coacervated complex; if desired, adjusting the pH of the material toward the alkaline side to promote hardening of the encapsulating material; stirring into the gelled material a solution of formaldehyde, or equivalent, in water to harden the encapsulating material; and finally, if desired, separating the capsules from the remaining liquid, drying them, and comminuting them if aggregated.

If gum arabic and gelatin are used, they, preferably, are used in the same concentration and amount to form the mixture. The amount of colloid used up as the emulsifier is so small as to be disregarded in computing the amounts of the colloid ingredients to be used in the mixture to be coacervated.

The iso-electric point of an amphoteric hydrophilic colloid material may be determined by forming an aqueous sol of it and testing it in the apparatus of Fig. 3 to determine the charge of the colloid ions. The thistle tube is filled with the sol 22, with the stop cock 21 closed. Water buffered to the pH of the sol then is introduced into the U-shaped portion 20 and the stop cock opened to admit the sol slowly until boundary layers are formed in both legs. Direct current is applied to the electrodes 23 and 24. If the colloid ions have negative charges, the separating interface line between the water and the sol will be higher in the leg containing the positive electrode than in the arm containing the negative electrode, as shown at 25, and vice versa. The iso-electric point may be ascertained by repeating the experiment with sols of various pH value until the boundaries remain level when electric potential is applied. Similarly, the natural charge of an ionized non-amphoteric hydrophilic colloid may be ascertained.

It is also necessary, in carrying out the process, to determine, by experiment, the dilution conditions under which the two selected kinds of colloids coacervate to form a colloid complex, and this may be done by testing sols containing the selected two colloids in various concentrations. This may be done experimentally for various pairs of colloids by preparing sols of them in various concentrations, mixing them, and diluting them slowly with water until a cloudy appearance indicates that complex coacervation has taken place. On standing, two layers will form, the coacervate colloid-rich layer still being liquid. Fig. 2 is a ternary diagram, the shaded area 30 at the top showing the region in which various concentrations of gum arabic and gelatin, having its iso-electric point at pH 8, coacervate. Such a diagram may be made for any two colloids with which it is desired to form the complex coacervate. Two sols are formed that are compatible. If the concentration of colloid material is too great, as in the region under curve 31, the sols will be incompatible and form two phases. The diagram is made by testing the mixtures of sols without the oil, as the oil will make the mixture opaque, so that the cloud point, indicating incompatibility or coacervation, cannot be seen.

If the mixture of colloids cannot be made to form a complex coacervate, the pH may be adjusted up or down to a point where experiments show that coacervation does take place upon dilution. Temperature also may be varied to a point where experiments show that coacervation takes place.

Considering the diagram of Fig. 2, more specifically, concentrations, of the particular colloids, below line 31 form incompatible mixtures; that is, the compatible sol mixture separates into two sols. As an instance of this, two sols are made, the first with 15 parts of gum arabic and 30 parts of water, and the second with 20 parts gelatin and 30 parts water. The light transmission of each sol is noted. If, now, these two sols are mixed together, the light transmission of the mixture is less than that of either sol alone, and, eventually, two layers will be formed, one being rich in one colloid and the other rich in the other colloid, showing the incompatibility of the sols and the unsuitability of the mixture for complex coacervation. The unsuitable mixture discussed is plotted approximately at 32. The light transmission may be roughly gauged by eye but is more accurately determined by an electrophotometer. Now, if two sols were made with the same gum arabic and gelatin, the first with 5 parts gum arabic and 80 parts water, and the second with 5 parts gelatin and 80 parts water, and mixed, the same clouding effect is noticed. In this case, however, a complex colloid is formed, by complex coacervation, forthwith and will separate out from the water by gravity, in time. In this case, the upper layer has practically no colloid material in it and will transmit light freely, whereas the lower layer is very cloudy. It is to be understood that there is no oil present in these tests.

A number of mixtures of low-concentration sols tested in the above manner will determine region 30, which is the coacervate region. Although the boundary of region 30 is given a sharp line, said boundary is not sharp, due to molecular weight variation in the particular polymers involved. However, it is readily ascertainable when the complete coacervation region has been entered. The region under line 31 and the enclosed region 30 having been determined, a point such as 33 is picked for making the mixture of sols for use in the process of this invention. Point 33 represents a sol mixture of 10% gelatin, 10% gum arabic, and 80% water. Dilution of this mixture with water added slowly produces the coacervation, the dotted line 34 representing the dilution necessary to take the mixture into the center of the coacervation region.

A ternary phase diagram, prepared as described, will furnish the necessary information for carrying out the process of this invention with any two selected colloid materials having in the mixture the necessary characteristics of different electric charge and gellability.

First, a specific example of the process will be given, when dilution only is used. A sol is made of 20 grams of gum arabic dissolved in 160 grams of water. Gum arabic in water always forms negative ions, it not being amphoteric, regardless of the pH. Into this is emulsified 80 grams of trichlorodiphenyl. A second sol of 20 grams of pork skin gelatin, having its iso-electric point at pH 8, and 160 grams of water is prepared, and this second sol is mixed with the emulsion. A volume of water then is added slowly to the mixture drop by drop, or by spray, with constant stirring until coacervation starts and is continued until the particle size of the oil droplets on which the coacervate material is deposited is as large as desired, the less water used the smaller the particle size. All of the foregoing steps are carried out with the ingredients at 50 degrees centigrade. The resulting coacervate mixture is poured into water at 0 degrees centigrade, enough water being used to bring the total weight of ingredients to 3960 grams. The mixture is agitated and thereafter is allowed to stand for an hour at not over 25 degrees centigrade. The formation of the capsules is now completed, and they may be used in suspension as a coating for surfaces or for other use as a fluid, or they may be dried and comminuted.

The capsular suspension resulting from the step of gelation, noted at 35 in Fig. 4, contains the coacervate capsules in usable form, the optional hardening step described above being used where it is desired to use heat to drive off the water or to render the capsules insoluble. If it is desired to use the capsules as a coating material for paper, the encapsulated particles at the step noted at 35 in Fig. 4 may be concentrated and applied to the paper and air-dried at a temperature below the melting point of the gel complex. Most of the water can be removed by centrifuging or filtering.

However, fast drying is desirable in coating paper, and the hardening step is provided as an optional step to permit the water to be driven off by heat.

The optional step to obtain a hardened capsular product from the coacervate suspensions requires the preferable step of adjusting the pH of the suspension of capsular material to between 9 and 11, by use of sodium hydroxide, and cooling the resulting slurry to zero degrees to 5 degrees centigrade; pouring in 19.8 grams of 37%, by weight, of formaldehyde in water adjusted to pH 9–11 with sodium hydroxide, and agitating for at least 10 minutes; and separating the resulting hardened capsules from the remaining liquid by filtering or centrifuging. Finally, if desired, the mass may be dried with heat (the hardening step preventing melting of the encapsulating material) and comminuted to the required granular size.

In filtering, first the free water is removed on a suction filter, then the filtrate mass is heated up to a maximum of 85 degrees centigrade to drive out the water which is bound in the gel network of the capsules. The water driven out of the gel, yet present in the mass, results in the formation of a smooth slurry of the capsules, which may be used as is while hot or filtered again. The hardened capsules suspended in water at the step marked 36 in Fig. 4 may be spray-dried in a hot environment to remove both the free water and the gel-bound water, or the spraying may be done after a first filtering step to remove the free water. If the slurry is allowed to cool after the first filtering and subsequent heating to drive out the water from the gel network, the water of the slurry will return to the gel network, leaving the mass as it was before heating. To avoid this return of the water to the capsule gel material, a dry hydrophilic colloid which preferentially will bind most of the water to itself is added to the hot slurry. With the materials used in the coacervate complex, high-viscosity polyvinyl alcohol added in the dry form will do, enough being used to attain the desired viscosity of the cooled material. The sol formed of the driven-off water and the added polyvinyl alcohol, or equivalent, will keep the material in fluid form on cooling.

The amount of oil used in proportion to the colloid ingredients of the complex may be varied greatly, as indicated at 37 in Fig. 4, where any amount up to 100 grams or more of the trichlorodiphenyl may be used with 40 grams of colloid material. Generally speaking, the more oil used, the thinner the encapsulating sheath will be, the oil drop size being maintained the same.

If the oil and the colloid material were used in equal amounts by weight, the capsule skin thickness would be greater. In addition to such thickening of the skin, aggregates of capsules are formed which seem to be encased in a mass of the colloid complex, whereas with the thinner-skinned capsules they agglomerate in bunches like grapes. Ordinarily, the aggregations and bunchings of the capsules are on a microscopic scale, but large enough aggregates to be barely visible to the unaided eye may be formed if sufficient dilution with water occurs in the coacervation step.

As examples of synthetic oils, mineral oils, vegetable oils, and animal oils which may be used in place of the trichlorodiphenyl used in the preferred embodiment of the invention may be mentioned methyl salicylate, petroleum oil, coconut oil, castor oil, and sperm oil. These oils were used in a proportion of 1 to 1, by weight, with the colloid materials. The hardening step when methyl salicylate is used must be at about pH 7, as at a pH above 7 there is chemical reaction between the sodium hydroxide and the methyl salicylate through the pore openings in the capsules. Whenever any such reaction is likely to occur between any of the ingredients, similar precautions should be taken.

The mixture of emulsion and sol need not contain equal parts, by weight, of the two colloids used, as will be evident from the diagram of Fig. 2. For instance, if the mixture contained 5% gelatin, 15% gum arabic, and 80% water, the dilution starting point would be at 38 on the diagram, and the coacervation region 30 could be obtained by diluting the mixture with water, in which event line 39 is followed. In this proportion of colloid material and water, the dilution could be made with a dilute gelatin sol. If a 5% gelatin sol were used, the line of dilution would be represented by broken line 40. If the starting mixture is at point 41, dilution with water would be along line 42, and dilution with a 5% gum arabic sol would be along line 43. From an observation of the diagram of Fig. 2, it will be obvious that less water dilution is needed when moving along center line 34 than when entering region 30 obliquely. The examples of starting mixtures represented at points 33, 38, and 41 are representative only and should not be deemed the only starting mixtures that could be used, as any convenient point between line 31 and region 30 could be a starting point.

Generally speaking, there should be no chemical reaction between the oil and the colloids, and the materials should be chosen with that point in mind.

Other agents than sodium hydroxide for adjusting the pH of the coacervate mixture are sodium carbonate and potassium hydroxide.

As was mentioned earlier, the encapsulated material could be either a printing fluid of an intrinsic color or a reactive ink that changes to a distinctive color when applied to sensitized record material. As examples of an oil with a color added may be mentioned Sudan III or Sudan IV dye in the before-mentioned trichlorodiphenyl. As examples of an oil with a colorless color reactant added may be mentioned 3,3 bis(p-dimethylaminophenyl)6 dimethylamino phthalide, or 3,3 bis(p-dimethylamino) phthalide in the trichlorodiphenyl.

With reference to Fig. 6, the process will be described where the mixture of sols and dispersed oil has the pH raised, before water is added, to a point where coacervation by dilution will not occur, and, after the addition of water, it is returned to the coacervate region by pH change.

Twenty grams of gum arabic is dissolved in 160 of water and emulsified with 80 grams of trichlorodiphenyl. This emulsion is mixed with a sol made of 20 grams of pigskin gelatin, with its iso-electric point at pH 8, and 160 grams of water. If desired, the emulsion may be made with the gelatin sol instead of the gum arabic sol, the sol which is used for making the emulsion being a matter of choice, or the sols may be mixed and the oil emulsified with the mixture. Good results may be obtained using up to 100 grams, or more, of the trichlorodiphenyl. The pH of the mixture of colloids and oil is about 4.5, and a complex coacervate will form if diluted according to the ternary diagram of Fig. 2. The process of dilution, when used, must be slow and uniform to insure proper deposition of the colloid material around the oil drops. To prevent this tedious dilution, the pH is adjusted to 5 or higher with 20% sodium hydroxide in water. The pH condition makes it impossible to cause complex coacervation of the colloids by the addition of the amount of water to be used. Next, 500 grams of water is introduced into the mixture, and the pH is slowly adjusted back to 4.5, which is in the complex coacervate range. Ten percent, acetic acid in water may be used for this pH adjustment. The 500 grams of water is a variable item, and, therefore, a larger or smaller amount may be used, depending on the oil drop size and the final aggregate size that is desired. In general, the larger the oil drop size the more water is needed, and the less water used the smaller will be the size of the capsule aggregates.

In all of the foregoing steps, the ingredients are kept at 50 degrees centigrade, and the mixture is being continuously agitated, but not so much as to cause foaming. By adjusting the pH back to 4.5, the mixture is taken into the complex coacervate region, and the complex colloid is deposited around the oil droplets. To harden the capsules—that is to say, to harden the encapsulating material—3½ grams of 37% formaldehyde in water is added to the mixture with agitation. This last step of adding the formaldehyde is also done with the ingredients kept at 50 degrees centigrade. In order to complete the hardening action, a subsequent pH adjustment after gelation is necessary to bring the mixture to the alkaline side.

The mixture is next gelated by lowering the temperature to 10 degrees centigrade during a thirty-minute interval, with agitation, whereupon the complex encapsulating material forms a gel within which the oil droplets remain fluid. After this, the pH is adjusted to 9 with a 20% solution of sodium hydroxide in water. Sodium carbonate may be substituted for the sodium hydroxide, if desired.

This last form of bringing about complex coacervation is generally more efficient than that where large quantities of water are used to dilute the mixture, in accordance with the ternary diagram of Fig. 2. In this modified form of the process, wherein the complex coacervation is brought about by adjusting the pH, a more efficient use of the colloid material is made—that is to say, practically all of the colloid material goes into the making of the capsule walls—whereas, in the dilution form of causing complex coacervation, some of the complex colloid material exists apart from the oil droplets.

The capsular material, containing the oil droplets, made in accordance with Fig. 6, is of such consistency that it may be used directly to coat on paper to form a film in which each of the oil droplets is enclosed in its own hardened colloid capsule. This material may also be dried and comminuted, as was the case with the material made by the dilution form of the process. In fact, the material is practically the equivalent of that made by the dilution form of the invention except for the improvement noticed in the efficient utilization of the colloid material, and except for the fact that not so much water needs to be removed.

That the capsules actually retain the oil droplets has been proved in various ways. The dried capsular material was placed in a Soxhlet extractor with toluene and subjected to extraction for a week. The material was then removed and dried. Upon crushing the capsular material, oil was released. Paper upon which a film of the material containing 3,3 bis(p-dimethylaminophenyl)-6-dimethylamino phthalide in the oil droplets was similarly treated in the Soxhlet extractor. Upon removal and drying, it was used as a transfer sheet and placed over paper coated with attapulgite clay. It made marks on the clay-coated sheet when subjected to printing and writing pressures, that were as intense as marks made therewith before the extraction attempt. The same paper was put in an oven and kept there with an amount of unprotected oil equal to that in the paper. Whereas the unprotected oil evaporated in one day, there was no evidence of any loss of oil from the paper, even through left in the oven for ninety days at the same temperature.

While the invention, including the ingredients and the steps, has been fully outlined in the foregoing specification, the steps are capable of some modification in regard to temperature and amounts of ingredients used, and the ingredients themselves, of course, may be changed, as indicated earlier in the specification.

What is claimed is:

1. The method of making oil-containing microscopic capsules of complex hydrophilic colloid material, including the steps of providing an oil; mixing the oil with two compatible aqueous sols in which the oil is emulsified, the two sols containing, respectively, different hydrophilic colloid materials having opposite electric charges in the mixture, at least one of the colloids being gellable; causing coacervation of the colloid material by adding water to dilute the colloid mixture to an extent sufficient, in the absence of oil, to bring about a cloudiness in the mixture, to produce, by separation, a complex colloid rich portion and a colloid poor portion with said portions in equilibrium, whereby the complex colloid rich material deposits by coacervate forces around the individual oil droplets as nuclei, individually encapsulating each droplet, leaving the resulting capsules dispersed in the residual liquid consisting of the colloid-depleted portion of the mixture, the foregoing steps being carried out while maintaining the mixture at a temperature above the gelation point of the colloids therein; and gelling the encapsulating complex colloid material by cooling.

2. Microscopic oil-containing capsules made according to the method of claim 1.

3. The method of claim 1 in which the colloids used are gum arabic and gelatin.

4. Microscopic oil-containing capsules made according to claim 3.

5. The method of claim 1 in which the mixture of sols is made by emulsifying the oil in one of the aqueous sols and mixing the emulsion with the other aqueous sol.

6. The method of making oil-containing microscopic capsules of gelled complex hydrophilic colloid material, including the steps of forming an oil-in-water emulsion with an aqueous sol of a first ionizable hydrophilic colloid material as the external phase and a selected oil as the internal phase; mixing said emulsion with an aqueous sol of a second ionizable hydrophilic colloid material, at least one of the colloid materials being gellable, said colloid materials being used in such concentration that they are compatible in the mixture and so the complex to be made of them will be gellable, and said colloids being selected so as to have opposite electric charges in the mixture, the pH of the mixture being adjusted, to bring about such difference in electric charge; diluting the mixture uniformly with water, enough water being used to bring about, in the absence of oil, a cloudiness in the mixture to cause complex coacervation of the colloid materials and deposition of the complex material around the oil droplets as nuclei, all of the foregoing steps being performed at a temperature above the gel point of the sols; and cooling the resulting coacervate product to cause gelation of the resulting complex colloid encapsulating material.

7. Microscopic oil-containing capsules made according to the method of claim 6.

8. The method of making oil-containing microscopic capsules of gelled complex hydrophilic colloid material, including the steps of forming an oil-in-water emulsion with an aqueous sol of a first ionizable hydrophilic colloid material as the external phase and a selected oil as the internal phase; mixing said emulsion with an aqueous sol of a second hydrophilic colloid material, at least one of the colloid materials being gellable, said colloid materials being used in such concentration that they are compatible in the mixture and so the complex to be made of them will be gellable, and said colloids being selected so as to have opposite electric charges in the mixture; adjusting the pH of the mixture upwardly so that complex coacervation will not be brought about by water-dilution of the mixture; adding water in an amount which would have caused complex coacervation had not the pH been adjusted upwardly; adjusting the pH of the mixture downwardly to where it was, thus bringing about deposition of a complex coacervate material about the oil droplets, all of the foregoing steps being performed at a temperature above the gel point of the sols; and cooling the resulting product to cause gelation of the resulting complex colloid encapsulating material.

9. Microscopic oil-containing capsules made according to the method of claim 8.

10. The method of making oil-containing microscopic capsules of complex colloid material, including the steps of making an aqueous sol of gum arabic; making an aqueous sol of gelatin having its iso-electric point at pH 8; dispersing in either sol a water immiscible oil; mixing the resulting emulsion and the other sol together; and causing the colloid materials to form a complex coacervate, by dilution of the mixture with water to bring it into area 30 of Fig. 2 of the drawings, which coacervate deposits around the oil droplets, all the foregoing steps being carried out at a temperature above the gel point of the ingredients; and lowering the temperature until the complex colloid material around the oil droplets gells.

11. Microscopic oil-containing capsules made according to the method of claim 10.

References Cited in the file of this patent

UNITED STATES PATENTS

| 2,183,053 | Taylor | Dec. 12, 1939 |
| 2,410,110 | Taylor | Oct. 29, 1946 |

FOREIGN PATENTS

| 454,386 | Germany | Jan. 6, 1928 |
| 514,047 | Great Britain | Oct. 30, 1939 |

OTHER REFERENCES

Bungenberg: Chemical Abstracts, vol. 46, February 25, 1952, p. 1605.

Basu: Science, vol. 115 (1952), pp. 544 to 545.

UNITED STATES PATENT OFFICE
CERTIFICATE OF CORRECTION

Patent No. 2,800,457                              July 23, 1957

Barrett K. Green et al.

It is hereby certified that error appears in the printed specification of the above numbered patent requiring correction and that the said Letters Patent should read as corrected below.

Column 3, line 42, after "provide" insert --microscopic--; column 7, line 56, after "160" insert --grams--.

Signed and sealed this 17th day of September 1957.

(SEAL)
Attest:

KARL H. AXLINE
Attesting Officer

ROBERT C. WATSON
Commissioner of Patents